PROCESS FOR THE MANUFACTURE OF HESPERIDIN

Filed Aug. 3, 1940

HESPERIDIN-CONTAINING SOURCE MATERIAL

1. LIMING WITH AGITATION — AS CALCIUM HYDROXIDE
2. EXTRACTION WITH AGITATION — CAUSTIC AS NaOH
3. PRESSING LIQUOR SAVED
4. NEUTRALIZATION OF LIQUOR — ACID AS HCl
5. SEPARATION OF SOLIDS FROM LIQUOR — AS BY CENTRIFUGING
6. CRYSTALIZATION
7. SEPARATION OF CRYSTALS — AS BY CENTRIFUGING
8. SOLUTION OF CRYSTALS — WATER AND NaOH
9. COAGULATION OF THE PECTINOUS MATTER — AS BY ISOPROPYL ALCOHOL
10. FILTRATION-FILTRATE SAVED
11. PRECIPITATION OF CRYSTALS — AS BY ADDITION OF ACIDS
12. SEPARATION OF CRYSTALS — AS BY CENTRIFUGING

INVENTOR
Ralph H. Higby
By Robert E. Harris
Attorney

Patented May 9, 1944

2,348,215

UNITED STATES PATENT OFFICE 2,348,215

PROCESS FOR THE MANUFACTURE OF HESPERIDIN

Ralph H. Higby, Ontario, Calif., assignor to California Fruit Growers Exchange, Los Angeles, Calif., a corporation of California Application August 3, 1940, Serial No. 350,800

15 Claims. (Cl. 260—210)

This invention relates to a process for the preparation of hesperidin.

Hesperidin is a natural glucoside of most citrus fruits, occurring, for the most part, in the albedo of the fruit. Fully purified hesperidin possibly may not have been produced as yet. However, the meaning of the term is well understood by those skilled in this art. Traces of hesperidin have been found in the juice of citrus fruit, as well as the leaves, twigs, and bark of the tree. Hesperidin is found also in other plants, as, for example, some of the Umbelliferae and Scrophularia.

Heretofore the preparation of hesperidin has been accomplished by treating crushed citrus fruit with dilute alcohol containing sufficient potassium hydroxide to overcome the acidity of the fruit. After this alcoholic leach had stood for several days, the liquor was separated from the crushed mass by filtration and impure hesperidin precipitated by means of hydrochloric acid. The crude material was then dissolved by boiling with acetic acid for a few minutes, and, after cooling, the resulting solution was filtered from the resinous impurities. Upon standing, the hesperidin gradually separated from the filtrate in the form of fine needles. These crystals of hesperidin were further purified by re-crystallization.

In attempting to follow out the above process on a commercial scale, considerable difficulty has been experienced. The necessity for using large quantities of alcohol makes the preparation very expensive, and, furthermore, the yield of pure hesperidin from the above method is extremely small, being in the neighborohood of about ¾ of a pound of hesperidin per ton of oranges.

I have now discovered that hesperidin may be produced from its various source materials, and more particularly from citrus fruit, by a new and relatively inexpensive method. Furthermore, by this new method the yields of hesperidin per ton of fruit are many times that heretofore obtainable.

This invention is directed, therefore, toward the manufacture of hesperidin, and, more particularly, to an improved method for its production.

Accordingly, an object of this invention is to provide and disclose new and novel methods and means of producing hesperidin, as by means of a non-alcoholic extraction of this glucoside from its source materials, e. g., citrus fruits.

Further objects and advantages of this invention will appear from the following description, in which the preferred embodiment of the present invention has been described in detail in conjunction with the accompanying flow sheet.

In the drawing, the figure represents a flow sheet illustrating a preferred form of the process, with variations.

In carrying out my invention relating to a new and novel method for the production of hesperidin, I may start with any of the source materials in which hesperidin is a naturally occurring component.

In the examples to follow, I mention oranges or materials prepared from oranges as being suitable. However, I do not wish to imply that my process is limited to these source materials.

Broadly, my method comprises first coagulating the pectinous or slimy constituents of the source material so that these constituents will not interfere with subsequent operations. Then the material is treated to convert the hesperidin to soluble form, in which form it is separated from the source material. Precipitation and purification follow.

In the preparation of hesperidin from oranges, I may proceed as follows:

Oranges are passed through a suitable pulping machine or press wherein the fruit is macerated and the juices separated therefrom. The macerated fruit may, or may not, then be passed through a chopper for the purpose of further disintegrating the peel. This peel is then suspended in a quantity of water to which slaked lime has been previously added. In carrying out this step 1 of the process, I have found it desirable to use a tank of suitable capacity, as for example 500 gallons, and one equipped with an agitator. In this tank is placed approximately 200 gallons of water to which I add about 10 pounds of slaked lime. This is sufficient water to suspend approximately one ton of the chopped orange peel, which is agitated therein for approximately fifteen minutes, after which, as indicated at 2, there is added a 25% caustic soda solution until the pH value of the mixture reaches a pH of about 11.0. This suspension or slurry is agitated for a further period of time, usually about thirty minutes, and then subjected to a pressing operation, indicated at 3, for the purpose of separating the hesperidin-containing liquor from the leached peel.

The liquor containing the hesperidin in solution is then, as indicated at 4, adjusted to a pH of approximately 4.5 by means of hydrochloric acid. At this pH the hesperidin will be precipitated from the solution. However, this precipitation proceeds rather slowly, and requires considerable time, so that I find it very convenient to centrifuge (or filter) the neutralized liquor soon after neutralization in order to separate fine pulp particles, lime, and other extraneous materials which tend to contaminate the crude hesperidin. This step of the process is indicated at 5. It is to be understood, however, that centrifugation may be undertaken prior to acidification, or the step may be omitted altogether, although I find it advisable to carry out the process as above mentioned. The centrifuged liquor is then placed in a precipitating tank. Crystallization of the hesperidin from this liquor, indicated at 6, seems to be complete in about 48 hours after acidification.

I have found it desirable in the operation at 4 to acidify the alkaline liquor continuously as it goes to the centrifugal separator, rather than to acidify the entire batch at one time, in order to avoid hesperidin losses due to premature crystallization. Also I have found it helpful to include a small amount of a diatomaceous earth at the same time the liquor is acidified, for the purpose of improving the clarity of the liquor, although this is not necessary to the successful operation of the process.

I refer to hesperidin crystallized in the manner above described as crude hesperidin since it usually contains minor impurities. These will usually be a very small portion of pectinous substances and a small amount of wax. Other glucosides occur in small quantities, such as eriodictin, and perhaps quercetin may be present. Limonin and isolimonin, which are in reality lactones, may be present in small amounts, also. Separation of impurities from the crude hesperidin may be accomplished by first separating the crystals from the mother liquor, as by centrifuging, indicated at 7. The crude hesperidin crystals are then dissolved in 0.2 N.NaOH. This is indicated at 8. An equal volume of isopropyl alcohol is then added. This will bring about a coagulation of certain of the impurities, particularly the pectinous matter, as indicated at 9, and will permit removal of these impurities by filtration, as indicated at 10. The filtrate is saved and is acidified to about pH 6.0, which again precipitates the crystalline hesperidin, as indicated at 11. The crystals are separated from the liquor by any suitable means, such as centrifuging, as indicated at 12.

Step 1 to bring about coagulation is illustrated as being performed with the well-known and easily and economically available alkaline earth, lime. Other calcium compounds or other alkaline earth compounds may, of course, be substituted.

In step 2 of the specific example, I have given the use of caustic soda for the purpose of adjusting the hydrogen ion concentration to a pH of about 11. However, it is to be understood that any alkali which is capable of effecting such a pH, and which will solubilize the hesperidin, i. e., form soluble salts of hesperidin, may be used for this purpose, as for example, potassium hydroxide, ammonium hydroxide, sodium carbonate, etc. While these alkali-acting substances form compounds with hesperidin which are often referred to as salts, they are more precisely called phenolates. The formation of these may occur at pH values slightly below 11.0. I prefer to stay within the range of pH 10.5 to pH 11.5. A higher pH will do no particular harm except that it tends to destroy the hesperidin and is wasteful of the materials employed.

I have found that ammonium hydroxide is very convenient for use in the extraction since after the extraction has taken place, the alkalinity of the material may be reduced by merely heating to a temperature sufficient to boil off the ammonia. This variation of the process is not only convenient to employ, but is also economical in that considerably less acid is required for the subsequent neutralization which effects the precipitation of the crude hesperidin.

With respect to step 4, many mineral or organic acids may be used in adjusting the hydrogen ion concentration of the hesperidin liquor to the point below pH 9, as for example, sulphuric acid, nitric acid, citric acid, acetic acid, etc.

In step 8, the use of sodium hydroxide has been specified. Potassium hydroxide, ammonium hydroxide, and equivalently acting substances may be substituted.

In step 9, reference is made to the use of isopropyl alcohol. Ethyl alcohol or methyl alcohol or any other conveniently available alcohol miscible with water will coagulate the pectinous matter.

Step 11 may be performed with any of the commoner acids such as acetic, citric, hydrochloric, sulphuric, etc., which themselves have no action upon the hesperidin.

Instead of employing steps 8 to 12, as outlined, it is possible to purify the crude crystalline hesperidin by dissolving in methyl alcohol, filtering the resulting solution, concentrating and permitting the hesperidin to crystallize out. To promote crystallization, the concentrate is diluted with water, whereupon the hesperidin separates out in relatively pure form.

Although methyl alcohol has been indicated as preferable for use in dissolving the crude hesperidin, other alcohols, such as ethyl, or isopropyl may be used, as may pyridine or acetic acid. In general, I have found that the solubility of hesperidin in alcohol decreases with decreased fluidity and volatility consequent upon increased molecular weight and it is, therefore, better to employ the low molecular weight alcohols. The hesperidin is much more soluble in pyridine than in methyl alcohol.

As mentioned before, it is understood that other materials may be used as the starting point for the production of hesperidin, in accordance with the disclosures herein contained. For example, citrus pulp from which pectinous materials have previously been extracted is an excellent source of hesperidin. Also I have found that the ground albedo from citrus fruit may be used as a starting material, in place of the whole fruit. When ground albedo is used, the yield of hesperidin per ton of material processed is considerably increased.

I have found further that although I propose to precipitate the hesperidin at a pH of between 4 and 5 for reasons hereinbefore mentioned, the hesperidin may be crystallized from the extraction liquor in impure form, when the pH is reduced below about pH 9.0.

I have found further that although it is possible to extract hesperidin from its source material at pH values above about 10, using aqueous alkali as the extracting agent, considerable difficulty is encountered due to the formation of soluble pectate through the interaction of the alkaline solution, and the pectinous substances in the source material. This reaction tends to soften the peel and interferes with the subsequent pressing. Also the liquor resulting contains considerable quantities of pectic materials which often set up to a weak jelly, thereby preventing crystallization and precipitation of the hesperidin. By first treating the source material with a solution of a calcium salt, the pectic materials are converted into insoluble pectates, and as such do not materially interfere in the subsequent operation. Only enough calcium salt to effect the coagulation of the colloidal material need be used. This reaction is evidenced by a hardening of the plant material and a decrease in its water-holding capacity. If one is operating with a hesperidin liquor which has become jellied, such liquor may be treated with a calcium compound, as for example, calcium chloride. This will cause the jell to contract and synerese so that it can be pressed.

Having thus described my invention in such full, clear, concise, and exact language as to enable others skilled in the art to make and use the same, I claim as my invention and desire to secure by Letters Patent the following.

I claim:

1. A process for the preparation of hesperidin which comprises the steps of adding, to plant material containing hesperidin, lime in amount sufficient to coagulate the slimy components of the plant material, adding caustic soda to said lime-treated material in amount sufficient to increase the alkalinity of said plant material to about pH 11, allowing the mixture to stand for a time sufficient to solubilize the hesperidin, recovering a liquor containing hesperidin from said material, adjusting the pH of the liquor to within a range of about pH 4 to about pH 5 by means of hydrochloric acid, and subsequently allowing the hesperidin to crystallize therefrom.

2. A process for the preparation of hesperidin which comprises the steps of adding, to plant material containing hesperidin, lime in amount sufficient to coagulate the slimy components of the plant material, adjusting the alkalinity of said plant material to about pH 11, allowing the mixture to stand for a time sufficient to solubilize the hesperidin, recovering a liquor containing hesperidin from said material, adjusting the pH of the liquor to within a range of about pH 4 to about pH 5, and subsequently allowing the hesperidin to crystallize therefrom.

3. A process for the preparation of hesperidin from plant material containing the same, which comprises first treating the plant material to coagulate slimy components thereof, thereafter adjusting the pH of the material to above 10.0 to promote the formation of soluble compounds of the hesperidin, allowing the mixture to stand for a time sufficient to permit the formation of substantial amounts of such compounds, treating the mixture to recover liquor therefrom, adjusting the pH of the liquor to below 9.0, and subsequently allowing the hesperidin to crystallize from the liquor.

4. A process for the preparation of hesperidin which comprises the steps of adding lime to plant material containing hesperidin in amounts sufficient to coagulate the slimy components of the plant material, adjusting the hydrogen ion concentration of said plant material to about pH 11 by means of caustic soda, allowing the mixture to stand for a time sufficient to solubilize the hesperidin, dewatering the mixture, adjusting the pH of the liquor so obtained to within a range of from pH 4 to 5 by means of hydrochloric acid, centrifuging the neutralized liquor and subsequently allowing the hesperidin to crystallize therefrom.

5. A process for the preparation of hesperidin from plant material containing the same, which comprises adjusting the pH of the material to above 10.0 to promote the formation of soluble compounds of the hesperidin, allowing the mixture to stand for a time sufficient to permit the formation of substantial amounts of such compounds, treating the mixture to recover liquor therefrom, adjusting the pH of the liquor to within a range of from 4.0 to 5.0 to promote the separation of the hesperidin from the soluble compounds thereof, centrifuging the liquor to remove impurities therefrom, subsequently allowing the hesperidin to crystallize from the liquor, dissolving said crystals in an aqueous alkali solution, separating impurities therefrom by the addition of alcohol, and subsequently separating hesperidin crystals in relatively pure form by the addition of acid to the solution.

6. A method of purifying relatively impure hesperidin which comprises the steps of dissolving the hesperidin in an alkaline aqueous solution, separating impurities therefrom by the addition of alcohol, and subsequently separating hesperidin crystals in relatively pure form by the addition of acid to the solution.

7. A method of purifying relatively impure hesperidin which comprises dissolving the hesperidin in an aqueous solution of sodium hydroxide, coagulating pectinous and/or slimy components of such material by the addition of isopropyl alcohol, filtering the material and adding acid to the filtrate to precipitate hesperidin crystals, and recovering the hesperidin in relatively pure form from the solution.

8. A process for the preparation of hesperidin which comprises the steps of adding, to plant material containing hesperidin, lime in amount sufficient to coagulate the slimy components of the plant material, adding ammonium hydroxide to said lime-treated material in amount sufficient to increase the alkalinity of said limed material to about pH 11, allowing the mixture to stand for a time sufficient to solubilize the hesperidin, recovering a liquor containing hesperidin from said material, heating said liquor to a temperature sufficient to remove the ammonia therefrom, adjusting the pH of the liquor to within a range of about pH 4 to about pH 5 by means of an acid and subsequently allowing the hesperidin to crystallize therefrom.

9. A process for the recovery of hesperidin from material containing the same, which comprises adjusting the pH of the material to a range of from 10.5 to 11.5, allowing the material to stand for a time sufficient to permit the formation of substantial amounts of soluble hesperidin compounds, recovering the liquor from the mixture and adjusting its pH to below 9.0, and allowing the hesperidin to crystallize.

10. In the recovery of hesperidin, the steps of extracting by alkaline treatment of hesperidin source material an aqueous liquor containing hesperidin in solution, adjusting the pH of said liquor downward to such a point that crystallization of the hesperidin from said liquor will occur without further treatment, then prior to any substantial crystallization of hesperidin, removing undesirable fines from the liquor, and thereafter separating hesperidin from the liquor by crystallization.

11. A process for the recovery of hesperidin from material containing the same, which comprises adjusting the pH of the material to a range above 10 to promote the formation of soluble hesperidin compounds, allowing the material to stand for a time sufficient to permit the formation of substantial amounts of soluble hesperidin compounds, recovering the liquor from the mixture and adjusting its pH to below 9.0, and allowing the hesperidin to crystallize.

12. A process for the preparation of hesperidin which comprises the steps of treating source material to coagulate the slimy components thereof, adjusting the alkalinity of the material to within the range of pH 10.5 to 11.5 to solubilize hesperidin, recovering hesperidin containing liquor therefrom, adjusting the pH of the liquor to below 9 to cause crystallization of hesperidin, separating hesperidin crystals from said liquor, dissolving the crystals in an alkaline aqueous solution, acidifying the solution of crystals to below pH 9, allowing crystallization of hesperidin to take place and finally separating hesperidin crystals.

13. A method of recovering hesperidin from materials containing the same, which comprises subjecting the material to alkaline extraction at a pH above 10 to solubilize the hesperidin, removing liquor containing the solubilized hesperidin from the material, acidifying the liquor to cause precipitation of hesperidin, and separating from the liquor the precipitated hesperidin.

14. A method of recovering hesperidin from plant materials which comprises treating the plant material with ammonium hydroxide to increase the pH to above 10 to solubilize the hesperidin, removing liquor containing the solubilized hesperidin, reducing the pH of the liquor to below about pH 9 to precipitate the hesperidin, and separating the precipitated material from the liquor.

15. A method of recovering hesperidin from plant materials which comprises treating the plant material with ammonium hydroxide to increase the alkalinity of said material to a range of from about pH 10.5 to about 11.5 to solubilize hesperidin, recovering a liquor containing solubilized hesperidin from said material, reducing the pH of the liquor to about pH 4 to pH 5 and allowing the hesperidin to precipitate therefrom.

RALPH H. HIGBY.